United States Patent [19]

Bobrek

[11] Patent Number: 4,498,035
[45] Date of Patent: Feb. 5, 1985

[54] CONTROL CIRCUIT FOR LINEARLY CONTROLLING THE SPEED AND DIRECTION OF AN AC POWERED DC MOTOR IN ACCORDANCE WITH THE MAGNITUDE AND POLARITY OF A DC REFERENCE SIGNAL

[76] Inventor: Pavlo Bobrek, 11 Potter St., Willimantic, Conn. 06226

[21] Appl. No.: 562,037

[22] Filed: Dec. 15, 1983

Related U.S. Application Data

[63] Continuation of Ser. No. 219,505, Dec. 23, 1980, abandoned.

[51] Int. Cl.³ .............................................. H02P 5/12
[52] U.S. Cl. ........................ 318/345 D; 318/345 H; 318/257
[58] Field of Search .......... 318/345 G, 345 R, 345 D, 318/345 H, 257, 293, 263, 268, 276, 301, 329; 323/284, 288, 242, 326; 307/265-267, 356

[56] References Cited

U.S. PATENT DOCUMENTS

| | | | |
|---|---|---|---|
| 3,402,338 | 9/1968 | Thoresen | 318/345 D X |
| 3,439,246 | 4/1969 | Moritz | 318/257 |
| 3,453,517 | 7/1969 | Kennedy et al. | 318/257 |
| 3,551,787 | 12/1970 | Walters | 318/345 X |
| 3,596,158 | 7/1971 | Watrons | 318/345 D X |

Primary Examiner—Ulysses Weldon
Attorney, Agent, or Firm—Yount & Tarolli

[57] ABSTRACT

A control circuit for use in controlling both the speed and direction of an AC energized DC motor in a linear relationship to the magnitude and polarity of a DC reference signal. This is accomplished with a triggerable bidirectional current conducting device, such as a triac, which is connected in series with a DC motor across an AC power supply source. A control circuit serves to trigger the bidirectional current conducting device into conduction at a selected firing angle during the positive or negative half cycle of the AC source in such a way that the firing angle is linearly related to the magnitude and polarity of a DC reference signal.

5 Claims, 6 Drawing Figures

4,498,035

CONTROL CIRCUIT FOR LINEARLY CONTROLLING THE SPEED AND DIRECTION OF AN AC POWERED DC MOTOR IN ACCORDANCE WITH THE MAGNITUDE AND POLARITY OF A DC REFERENCE SIGNAL

This application is a continuation of application Ser. No. 219,505, filed Dec. 23, 1980, now abandoned.

BACKGROUND AND FIELD OF THE INVENTION

The invention relates in general to energy conservation by controlling the delivery of a fraction of positive or negative energy from an AC source of power to a DC device, such as a DC motor. More specifically and with reference to the embodiment described herein, the invention relates to controlling the speed and direction of an AC powered DC motor in linear relationship to the magnitude and polarity of a DC reference signal.

It has been known in the prior art to control both speed and direction of a DC motor. Such prior art includes the use of a triggerable bidirectional current conducting device, such as a triac, connected in series with a DC motor across an AC source. The motor direction is controlled by triggering the triac into conduction during either the positive or negative half cycle of the AC source. One such example in the prior art takes the form of the U.S. Pat. No. 3,857,077 to T. E. Kasmer. While Kasmer provides directional control there is no means provided for linearly controlling the operation in relation to a command signal, such as a DC reference. Control is only achieved during a portion of each of the half cycles and, hence, this limits the amount of energy that may be delivered to the DC motor.

SUMMARY OF THE INVENTION

It is an object of the present invention to extract a controlled fraction of either positive or negative energy from an AC source by an efficient means and in suitable form for powering DC devices, such as motors.

It is a more specific object of the present invention to control the speed and direction of an AC powered, DC motor so as to operate in a linear relationship with respect to the magnitude and polarity of a DC reference signal.

In accordance with one aspect of the present invention a control circuit controls both the speed and direction of an AC energized, DC motor in a linear relationship to the magnitude and the polarity of a DC reference signal. A triggerable bidirectional current conducting means is adapted to be connected in series with the DC motor across an AC power supply source. The control circuit serves to trigger the bidirectional current conducting means into conduction at a selected firing angle during the positive or negative half cycle of the AC source so that the firing angle is linearly related to the magnitude and polarity of the DC signal.

BRIEF DESCRIPTION OF THE DRAWINGS

The foregoing and other aspects and advantages of the present invention will become more readily apparent from the following detailed description, as taken in conjunction with the accompanying drawings, wherein.

DETAILED DESCRIPTION OF SPECIFIC PREFERRED EMBODIMENT

Figure 1:
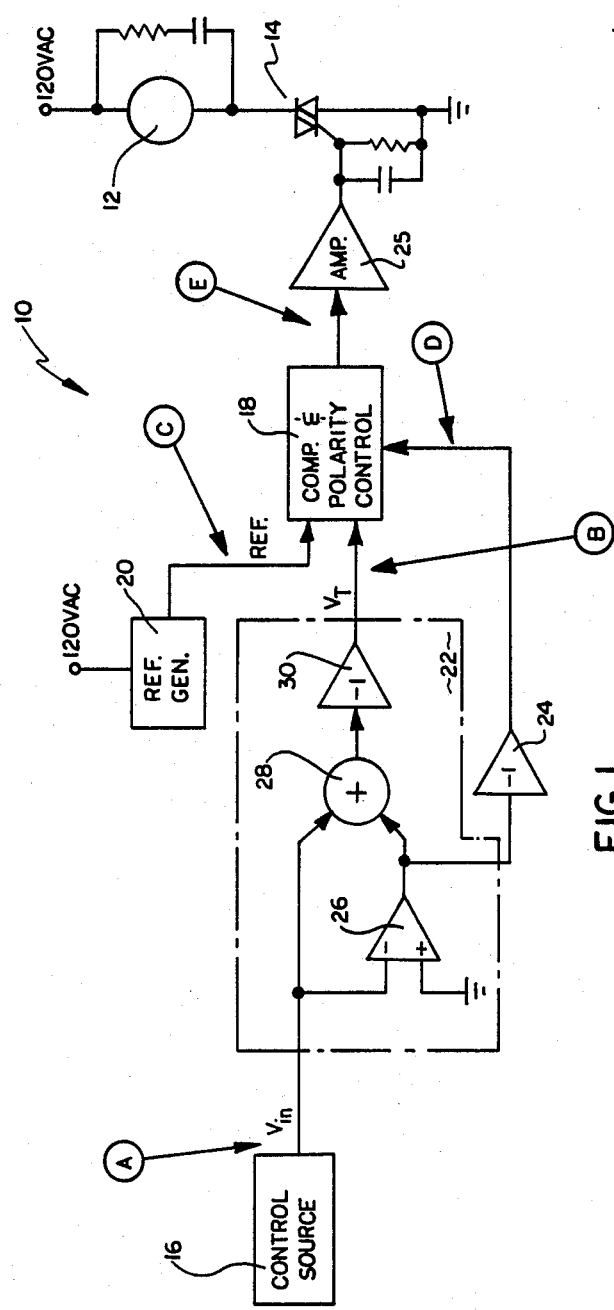
FIG. 1 and FIG. 1A are an overall block diagram of the DC motor control circuit and a transfer characteristic, respectively.

FIG. 1 illustrates in block form a circuit, generally indicated at 10, for controlling the supply of power to a DC motor 12. The DC motor 12 is interconnected with an AC power source (not shown) through a bidirectional current conducting element 14, illustrated as a triac.

To control the speed and direction of the DC motor 12, the control circuit 10 provides control pulses to the triac 14 for controlling the firing time thereof during each cycle of the AC power source. The durations and times of occurrence of these control pulses will be determined in accordance with the magnitude and polarity of a control signal $V_{in}$. When the polarity of the control signal is positive, then the control pulses will trigger the triac 14 during the positive half cycles of the AC power line, with the firing time being selected so that the conduction angle of the triac 14 during the positive half cycles is proportional to the magnitude of the control voltage. When the control voltage is negative, on the other hand, the control pulses provided to the triac 14 will trigger it during the negative half cycles, wherein the timing of the trigger pulses is again selected so that the conduction angle of the triac 14 during the negative half cycles is proportional to the magnitude of the control voltage.

Consequently, when the control voltage is positive, positive voltage pulses are applied to the DC motor 12, where the duration of the pulses is proportional to the magnitude of the control voltage. Similarly, when the control voltage is negative, negative pulses are applied to the DC motor 12, where the duration of the pulses is again dependent upon the magnitude of the control signal. In either case the pulsed power signal is unidirectional, and therefore includes a DC component. The magnitude and direction of this DC component is proportional to the duration and polarity of the AC pulses, which in turn are controlled by the magnitude and polarity of the applied control signal $V_{in}$.

Since the repetition rate of the power pulses applied to the motor is greater than the DC motor 12 can respond to, the DC motor essentially responds to only the DC component of the pulsed power signal. The speed and direction of the motor may therefore be controlled by controlling the magnitude and polarity of the control signal $V_{in}$.

Figure 2:
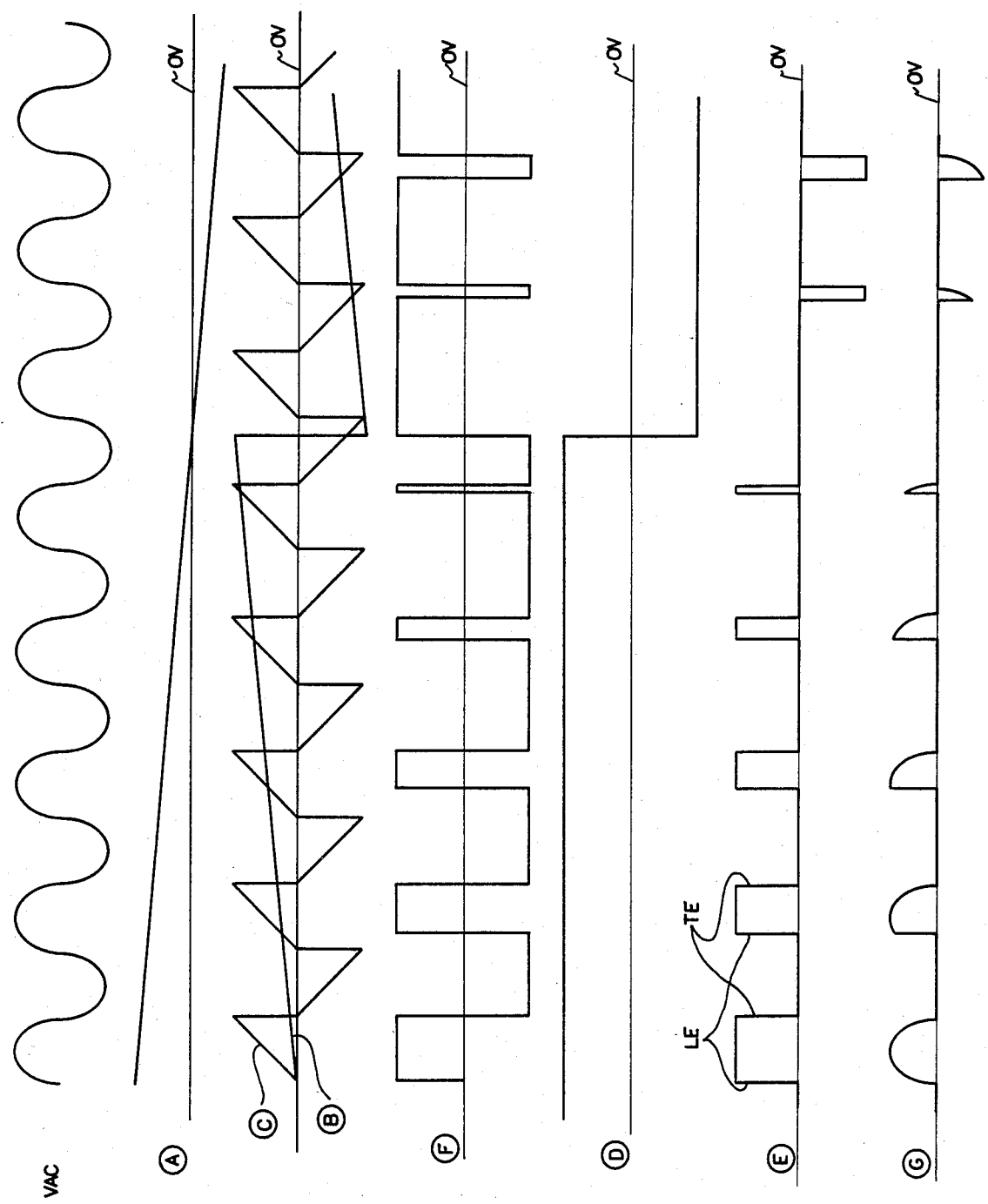
FIG. 2 is a sequence of waveform diagrams useful in understanding the operation of the DC motor control circuit of FIG. 1.

To better understand the more detailed description which follows, reference should be made to the waveforms of FIG. 2, which represent the waveforms of the signals appearing at various places throughout the control circuit 10 shown in FIG. 1. These waveform signals represent those which would result if a control signal $V_{in}$ were provided which began at a positive full scale voltage level, and shifted in a negative direction past a zero voltage level to a negative voltage level. It will be appreciated that this control signal waveform is, however, purely exemplary and is in no way intended to limit the description which follows. The control signal applied by the control signal generating circuit 16 may, of course, assume any DC value between positive and negative full scale and may vary in any arbitrary manner between these two limits.

Figure 1A:
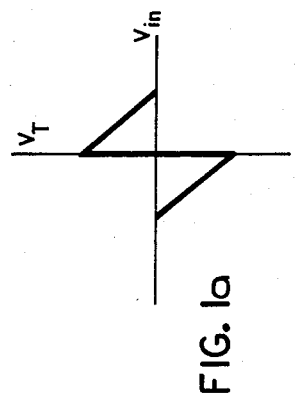

In order to generate the control pulses which are applied to the triac 14, the control circuit 10 includes a comparison and polarity control circuit 18 which compares an output signal provided by a reference generator circuit 20 with a threshold signal provided by a threshold generator circuit 22. The reference generator circuit 20 provides a reference signal (waveform C of FIG. 2) which includes a positive-going ramp in each positive half cycle of the applied AC power signal, and a negative-going ramp during each negative half cycle of the applied AC power signal. The threshold circuit 22, on the other hand, responds nonlinearly to the input signal $V_{in}$ in accordance with the transfer characteristic shown in FIG. 1A to provide a threshold signal $V_t$ (waveform B in FIG. 2) against which the reference signal is compared.

Referring to the waveforms of FIG. 2, the waveform F represents the results of his comparison for a control signal having the form represented by waveform A in FIG. 2. Whenever the threshold signal provided by the threshold generator 22 (waveform B) is lower in value than the reference signal generated by the reference generator 20 (waveform C), the output of comparator will be at positive full scale. When the reference signal is lower in value than the threshold signal, however, the comparator output will be at negative full scale. (The comparators which provide the waveform F shown in FIG. 2 are internal to the comparator and polarity control block 18 of FIG. 1, and will be described in detail hereinafter with reference to FIG. 5.)

The output waveform E of the comparison and polarity control circuit 18 of FIG. 1 is derived from the comparator output signal. As can be seen in FIG. 2, the comparator output represents essentially a pulse-width modulated signals, wherein either the ON or the OFF time is modulated by the control signal in dependence upon the polarity of the control signal. The output of the comparison and polarity control circuit 18 (waveform E) is derived from this comparator output signal by causing the output to selectively follow either the positive going portions or the negative going portions of the comparator output signal in dependence upon a polarity control signal (represented by waveform D of FIG. 2) supplied by an inverter circuit 24.

The polarity control signal will have a positive full scale voltage level when the control signal $V_{in}$ is positive, and will have a negative full scale voltage level when the control signal $V_{in}$ is negative. The comparison and polarity control circuit 18 responds to this polarity control signal by providing the positive going portions of the comparator output signals whenever the polarity control signal is positive, and providing the negative going portions of the comparator output signal whenever the polarity control signal is negative. For the comparator output signal F and the polarity control signal D shown in FIG. 2, the output of the comparison and polarity control circuit 18 will have the waveform shown at E in FIG. 2. The output of the comparison and polarity control circuit 18 is applied to the gate of the triac 14 through an amplifier 25.

The output of the comparison and polarity control circuit 18 of FIG. 2 has several distinctive features. First, the time occurrence of the leading edge LE of each of the pulses thereof occurs at a point in the AC cycle which varies in direct relation to the magnitude of the control signal $V_{in}$. The triac will trigger at these leading edges, and will remain in conduction until the gate pulse is removed and current through the triac falls to zero. The trailing edges TE always coincide with the zero crossing of the applied AC power signal. Presuming that the motor 12 appear essentially as a resistive load (a condition met by bypassing the motor with an appropriate impedance network), the current through the triac will also drop to zero at the AC zero crossings, hence the triac will drop out of conduction at that time.

Furthermore, the pulses of the waveform E occur during either the negative half cycles or the positive half cycles of the applied AC power signal, depending upon the polarity of the control signal $V_{in}$ at that particular time. Triac conduction will therefore selectively occur during either positive or negative half cycles. Finally, the polarity of the trigger pulses is the same as the polarity of the AC half cycles during which they occur. The triac 14 triggers more easily under this condition.

The power signal appearing across the DC motor 12 as a result of a comparison and polarity control circuit output as shown in FIG. 2 (waveform E) is shown as waveform G in FIG. 2. It can be seen that the polarity and duration of these applied AC power pulses is directly related to the polarity and magnitude of the applied control signal $V_{in}$.

Referring again to FIG. 1, the threshold circuit 22 which generates the threshold signal $V_T$ with which the reference signal is compared includes a comparator 26 which compares the amplitude of the applied control signal $V_{in}$ with a ground reference. The output of the comparator 26 will be at either positive or negative full scale depending, respectively, on whether the applied control signal is negative or positive. It is the output of comparator 26, as inverted by the inverter 24, which represents the polarity control signal (waveform D, FIG. 2) applied to the comparator and polarity control network 18. The output of comparator 26 is added to the applied control signal $V_{in}$ in a signal adder circuit 28. The output of the adder circuit 28 is then inverted in another analog inverter 30.

The effect of the adder 28 and inverter 30 is to invert the magnitude, but not the polarity of the applied control signal $V_{in}$. Thus, if the applied control signal starts out at positive full scale and diminishes to nearly zero volts, the threshold signal $V_T$ provided at the output of inverter 30 will begin slightly above zero and will increase to substantially positive full scale. If, as in the FIG. 2 example, the applied control signal $V_{in}$ then shifts from slightly positive to slightly negative, the output of comparator 26 will abruptly shift from negative full scale to positive full scale, introducing a level transition in the output of inverter 30 which causes the threshold signal $V_T$ to similarly abruptly shift from positive full scale to negative full scale. Thus, for an applied control signal having the waveform shown at A in FIG. 2, the output of the threshold circuit 22 will have the form represented at B in FIG. 2.

Figures 3, 4:
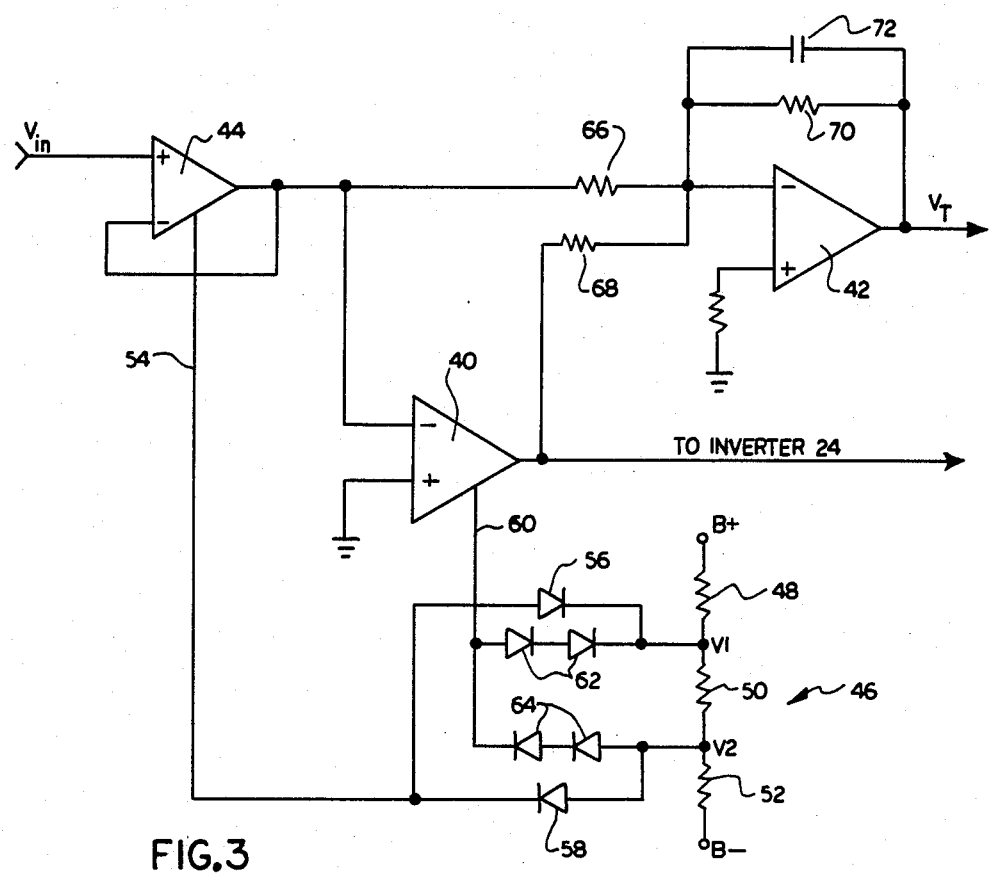
FIG. 3 is a more detail circuit schematic of the threshold generator circuit shown generally in FIG. 1.
FIG. 4 is a more detail circuit schematic of the reference generator circuit shown in block form in FIG. 1.

FIG. 3 presents a more detailed circuit schematic of the threshold generator circuit shown generally at 22 in FIG. 1. In FIG. 3, an operational amplifier 40 corresponds to the comparator 26, and an operational amplifier 42 performs the functions of both the adder 28 and the inverter 30. A third operational amplifier 44, not shown in the simplified schematic of FIG. 1, is provided to buffer the input signal to the threshold generator.

In order to prevent ambiguous outputs from the threshold generator circuit, the circuitry of FIG. 3 includes a clipping circuit, generally indicated at 46 for controlling the relative magnitudes of the maximum permissible voltage at the outputs of operational amplifiers 40 and 44. The effect of this circuit is to prevent the magnitude of the buffer 44 from exceeding the magnitude of the output of comparator 40.

In the example being described, the operational amplifiers 40 and 44 are of the type having a frequency compensation input (such as Signetics LM301 operational amplifiers). The frequency compensation connection is actually the output of an intermediate, low current drive stage of the operational amplifier. Since the amplifier output is derived from this stage, output limiting can be implemented by applying appropriate limiting to the signal on the frequency compensation connection. The clipping function is implemented in FIG. 3 by connecting these frequency compensation inputs to the clipping network 46 through appropriate diode circuitry.

The clipping circuit 46 includes three resistors 48, 50 and 52 which are interconnected in series between the B+ and B− supplies. The voltages V1 and V2 appearing at the junctions between resistors 48 and 50 and resistors 50 and 52, respectively, represent the desired maximum permissible positive and negative full scale voltages to be provided by the two operational amplifiers 40 and 44. The frequency compensation connection 54 of buffer amplifier 44 is connected to reference voltage V1 through diode 56 and is connected to reference voltage V2 through diode 58.

In the event that the voltage appearing at the connection 54 of operational amplifier 44 exceeds the voltage V1, then diode 56 will become forward biased, and the frequency compensating line 54 will be loaded by the resistors 48, 50 and 52. Since the voltage at the output 54 of operational amplifier 44 has very low current drive, this will have the effect of limiting that voltage to the reference voltage V1. Similarly, if the voltage appearing at the frequency compensating output 54 drops below the reference voltage V2, then the diode 58 will become forward biased, essentially limiting the voltage at the frequency compensating input from dropping below this reference voltage.

These limitations on the voltages appearing at the frequency compensating input 54 to the operational amplifier 44 have the effect of applying corresponding amplitude constraints to the voltage appearing at the conventional output thereof. Consequently, the maximum permissible positive or negative outputs of the buffer amplifier 44 are the voltages V1 and V2, plus and minus one diode drop, respectively.

These same reference voltages V1 and V2 are connected to the frequency compensating input 60 of comparator 40 through two sets of series-connected diodes 62 and 64. The purpose and effect of these diodes is the same as the diodes 56 and 58, except that the voltage appearing on the frequency compensating connection 60 of comparator 40 must now be two diode drops above or below the reference voltages in order for the limiting action to take place.

The output of comparator 40 is therefore limited to voltages which are one diode drop greater in magnitude than the limiting voltages of the output of amplifier 44. This insures that, when the output of amplifier 44 is at positive full scale, the output of the threshold circuit 22 will not drop below zero.

The outputs of amplifiers 44 and 40 are added together by two equal-valued precision resistors 66 and 68, which connect the outputs thereof to the inverting input of the operational amplifier 42. Amplifier 42 operates in an inverting amplifier mode due to the inclusion of a feedback resistor 70 between the output and the inverting input thereof. This feedback resistor 70 is bypassed by a capacitor 72 so as to limit the rate of change of the threshold signals $V_T$ provided at the output thereof.

FIG. 4 is a more detailed circuit schematic of the reference generator circuit shown in block diagram form in FIG. 1. This reference generator includes a comparator 80 to which the AC signal is applied through an input circuit 82. The output of the comparator is essentially a squarewave signal having positive lobes when the AC signal is in its positive half cycle and negative lobes when the AC signal is in its negative half cycle. This squarewave signal is integrated by an inverting integrater 84 including an operational amplifier 86 having an integrating capacitor 88 connected between its output and inverting input. A clamping diode 90 is connected in parallel with capacitor 88 to prevent the voltage across capacitor 88 from rising much above zero volts, thereby essentially clamping the comparator output to a ground voltage level. The output of the integrater 84 is therefore a triangular wave having a negative going ramp during positive lobes of the squarewave provided by the comparator 80, and positive going ramps during the negative going lobes of the comparator output. A signal subtractor 92 converts this triangular wave into the desired reference wave by subtracting the output of integrator 84 from the squarewave appearing at the output of comparator 80, as level shifted by a level shifter 94. The signal subtractor 92 and level shifter 94 are conventional in form, and will not be described in detail for that reason.

Figure 5:
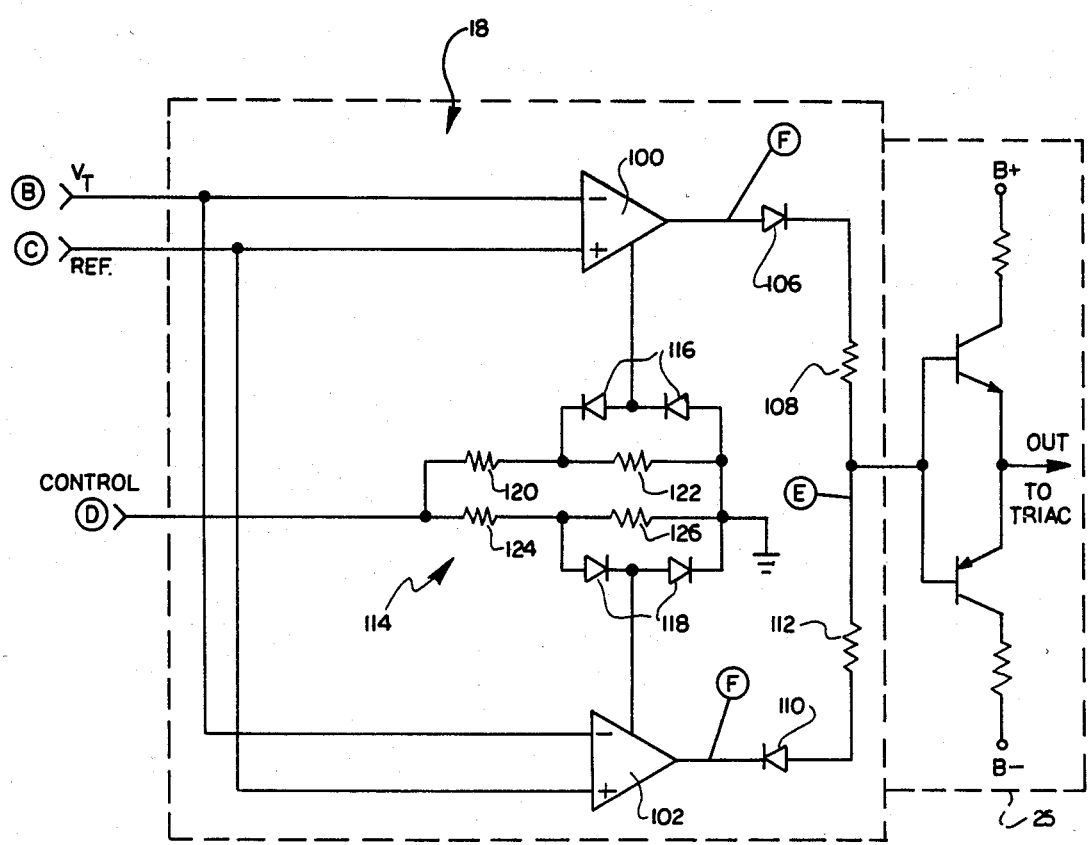
FIG. 5 is a more detail circuit schematic of the comparison and polarity control circuit shown in block, form in FIG. 1.

FIG. 5 is a more detailed circuit schematic of the comparator and polarity control circuit 18 shown in block form in FIG. 1. This comparator and polarity circuit 18, as configured in FIG. 5, includes two comparators 100 and 102, both having the threshold signal $V_T$ applied to the inverting input thereof and the reference signal applied to the noninverting input thereof. In the example illustrated in the waveforms in FIG. 2, the output of each of these comparators 100 and 102 would correspond with the comparator output signals represented by the waveform F if they were continuously enabled (as will be brought out hereinafter, only one will in fact be enabled at any given time). Thus, the outputs of each of these comparators will, when enabled, be at a positive full scale voltage whenever the reference voltage exceeds the threshold voltage, and will be at negative full scale whenever the threshold voltage exceeds the reference voltage.

The output of comparator 100 is connected to the output of the comparison and polarity control circuit 18 through diode 106 and resistor 108, connected in series, whereas the output of comparator 102 is connected to the output of the comparator and polarity control circuit 18 through a series connected circuit consisting of diode 110 and resistor 112. The two diodes 106 and 110 are poled in opposite directions so that they respectively pass the positive going portions and the negative going portions of the outputs of their associated comparators 100 and 102. Because of this, it is possible to select either the positive going portions or the negative going portions of the comparator output waveform F of FIG. 2 by selectively enabling either comparator 100 or comparator 102.

To provide the desired output of the comparison and polarity control circuit 18, the enablement of the two comparators 100 and 102 is controlled in accordance with the polarity control signal provided by the output of invertor 24, shown in FIG. 1. This control signal is applied to a diode switching circuit, generally indicated at 114, which serves to enable comparator 100 and disable comparator 102 when the control signal is positive, and enable comparator 102 and disable comparator 100 when the control signal is negative. This control function is accomplished through selective grounding of the frequency compensating connections of the two comparators 100 and 102, which are again Signetics LM301 operational amplifiers in the example being described.

The selective grounding of these frequency compensating connections is in each case controlled by a corresponding pair of series-connected diodes 116 or 118, where the pairs of diodes are poled in opposite directions. The polarity control voltage is applied to each pair of diodes 116, 118 by a corresponding pair of series-connected resistors 120, 122 and 124, 126. Resistors 120 and 122 are connected in series between the polarity control signal line and ground, as are resistors 124 and 126. The diodes 116 are connected in parallel with resistor 122, whereas diodes 118 are connected in parallel with resistor 126. The diodes 116 are poled to be forward biased by a negative polarity control signal, whereas diodes 118 are poled to be forward biased by a positive polarity control signal.

When the control signal applied to the diode switching network 114 is positive, diodes 116 will be reverse biased, hence the frequency compensating input of comparator 100 will be essentially floating. In this event the comparator 100 is enabled, and will provide an output signal. The diodes 118, on the other hand, will be forward biased, hence the frequency compensating input of comparator 102 will be effectively coupled to ground. This disables the comparator 102, preventing it from contributing to the output of the comparison and polarity control circuit 18. The output of the comparison and polarity control circuit will in this event follow the positive going pulses of the comparator output waveform.

When the control signal applied to the diode switching network 114 is negative, on the other hand, the diodes 116 will be forward biased, hence the frequency compensating connection comparator 100 will be effectively connected to ground and comparator 100 will be disabled. The diodes 118, on the other hand, will be reversed biased, hence comparator 102 will be enabled. In this event the output of the comparator and polarity control circuit will follow the negative going pulses of the comparator output waveform. The output represented at waveform E in FIG. 2 is thus generated from the comparator output signals represented in exemplary form at F in FIG. 2. The output of the comparator and polarity control circuit 18 is taken from the junction of resistors 108 and 112 and is applied to the triac 14 through a conventional push/pull amplifier represented at 25.

Although the invention has been described with respect to a preferred embodiment, it will be appreciated that various rearrangements and alterations of parts may be made without departing from the spirit and scope of the present invention, as defined in the appended claims.

What is claimed is:

1. A control circuit for controlling the speed and direction of an AC powered DC motor in a linear relationship to the magnitude and polarity of a DC reference signal, comprising:
   triggerable bidirectional current conducting means adapted to be connected in series with a DC motor across an AC voltage supply source; and
   control means for triggering said bidirectional means into conduction for energizing said DC motor at a selected firing angle of said AC source during the positive or negative half cycle thereof in such a way that the firing angle is linearly related to the magnitude and polarity of said DC reference signal, said control means including signal transfer means responsible to said DC reference signal for providing therefrom a DC threshold signal which is always inverted in magnitude but not inverted in polarity relative to said DC reference signal.

2. A control circuit as set forth in claim 1, wherein said bidirectional means is a triac which is triggered into conduction by said control means so that the duration of its on time is directly proportional to the magnitude of said DC reference signal and occurs during a half cycle of a polarity dependent on the polarity of said DC reference signal.

3. A control circuit as set forth in claim 2 wherein said control means includes phase angle conversion means responsive to said AC supply source for providing a phase angle signal for each half cycle thereof of a corresponding polarity and of a magnitude that linearly varies with said phase angle.

4. A control circuit as set forth in claim 3 wherein said control means includes comparator means responsive to said signal transfer means and said phase angle conversion means for comparing said DC threshold signal and said phase angle signal and supplying a trigger signal having a polarity and pulse width dependent upon said comparison for triggering said bidirectional means into conduction.

5. A control circuit as set forth in claim 4 wherein said comparator means includes means for limiting the magnitude of said trigger signal to a maximum value corresponding with a full speed command by said DC reference signal for motor operation.

* * * * *